(12) United States Patent
Maro (10) Patent No.: US 11,284,554 B2
(45) Date of Patent: Mar. 29, 2022

(54) METHOD OF CONTROLLING WEIGHT TRANSFER OF AN IMPLEMENT AND SYSTEM THEREOF

(71) Applicant: DEERE & COMPANY, Moline, IL (US)

(72) Inventor: Randall A. Maro, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 340 days.

(21) Appl. No.: 16/396,816

(22) Filed: Apr. 29, 2019

(65) Prior Publication Data

US 2020/0337205 A1 Oct. 29, 2020

(51) Int. Cl.
*A01B 63/14* (2006.01)
*A01C 7/20* (2006.01)
*A01B 63/22* (2006.01)

(52) U.S. Cl.
CPC ............ *A01B 63/145* (2013.01); *A01C 7/203* (2013.01); *A01B 63/22* (2013.01)

(58) Field of Classification Search
CPC ........ A01B 63/145; A01B 63/22; A01C 7/203
See application file for complete search history.

(56) References Cited

U.S. PATENT DOCUMENTS

| | | |
|---|---|---|
| 6,098,682 A | 8/2000 | Kis |
| 8,863,676 B2 | 10/2014 | Brockmann et al. |
| 9,198,343 B2 | 12/2015 | Mariman et al. |
| 10,045,474 B2 | 8/2018 | Bachman et al. |
| 2014/0000919 A1 | 1/2014 | Bachman et al. |
| 2015/0013579 A1 | 1/2015 | Mariman et al. |

FOREIGN PATENT DOCUMENTS

EP 3284329 A1 2/2018

OTHER PUBLICATIONS

Extended European Search Report and Written Opinion issued in European Patent Application No. 20169489.0, dated Sep. 24, 2020, in 9 pages.

*Primary Examiner* — Tara Mayo-Pinnock
(74) *Attorney, Agent, or Firm* — Taft Stettinius & Hollister LLP; Stephen F. Rost (57) ABSTRACT

An implement for traversing a field includes a main frame section and a frame wing section pivotally coupled to the main frame section. The frame wing section includes a wing wheel assembly for supporting the frame wing section. A hydraulic control system includes a pressure source, a control valve fluidly coupled with the pressure source, and an actuator assembly fluidly coupled to the control valve. The implement further includes a controller electrically coupled with the control valve. A wheel force sensor is configured to detect an amount of force on the wing wheel assembly and communicate the amount of force to the controller. The actuator assembly is coupled between the main frame section and the frame wing section. The controller operably controls movement of the control valve to actuate the actuator assembly and adjust the amount of force on the wing wheel assembly.

18 Claims, 5 Drawing Sheets

METHOD OF CONTROLLING WEIGHT TRANSFER OF AN IMPLEMENT AND SYSTEM THEREOF

FIELD OF THE DISCLOSURE

The present disclosure relates to an implement, and in particular, to a method of controlling weight transfer of the implement.

BACKGROUND OF THE DISCLOSURE

During operation, planting, seeding and tillage machines or implements often require a certain amount of force or weight to keep ground-engaging tools engaged properly in the ground. As conditions change, e.g., soil conditions, the amount of force required to maintain the amount of force changes. As it does, the amount of force transferred and applied at any given frame section of the machine or implement can change too.

In addition, some conventional systems are designed to distribute excess weight on the implement or machine to all of the tires or tracks to control how much weight is handled by each, respectively. These systems often seek to distribute the weight evenly over the entire machine or implement.

SUMMARY

In one embodiment of the present disclosure, an agricultural implement for traversing a field to perform a work function includes a main frame section including a main wheel assembly for supporting the main frame section; a first frame wing section pivotally coupled to a first side of the main frame section, the first frame wing section including a first wing wheel assembly for supporting the first frame wing section; a second frame wing section pivotally coupled to a second side of the main frame section, the second frame wing section including a second wing wheel assembly for supporting the second frame wing section; a hydraulic control system comprising a pressure source for supplying hydraulic fluid, a first control valve and a second control valve disposed in fluid communication with the pressure source, a first actuator assembly fluidly coupled to an outlet of the first control valve, and a second actuator assembly fluidly coupled to an outlet of the second control valve; a control system comprising a controller disposed in electrical communication with the first and second control valves; and a first wheel force sensor and a second wheel force sensor electrically coupled to the controller, the first wheel force sensor configured to detect an amount of force being transferred to the first wing wheel assembly, and the second wheel force sensor configured to detect an amount of force being transferred to the second wing wheel assembly; wherein, the first actuator assembly is operably actuated based on an amount of hydraulic pressure received from the first control valve, and the second actuator assembly is operably actuated based on an amount of hydraulic pressure received from the second control valve; further wherein, the first actuator assembly is coupled between the main frame section and the first frame wing section and the second actuator assembly is coupled between the main frame section and the second frame wing section.

In one example of the present embodiment, the controller operably controls movement of the first control valve to actuate the first actuator assembly and adjust the amount of force being transferred to the first wing wheel assembly; and the controller operably controls movement of the second control valve to actuate the second actuator assembly and adjust the amount of force being transferred to the second wing wheel assembly. In a second example, the implement may include a first pressure sensor and a second pressure sensor disposed in electrical communication with the controller, where the first pressure sensor detects an amount of hydraulic pressure output by the first control valve to the first actuator assembly, and the second pressure sensor detects an amount of hydraulic pressure output by the second control valve to the second actuator assembly. In a third example, the hydraulic control system may include a first accumulator fluidly coupled with the first actuator assembly and a second accumulator fluidly coupled with the second actuator assembly. In a fourth example, the controller is configured to receive a force measurement from the first wheel force sensor, compare the force measurement to a threshold, and adjust an amount of current sent to the first control valve depending upon whether the force measurement is greater or less than the threshold.

In another embodiment of the present disclosure, an implement for traversing a field includes a main frame section including a main wheel assembly for supporting the main frame section; a frame wing section pivotally coupled to the main frame section, the frame wing section including a wing wheel assembly for supporting the frame wing section; a hydraulic control system comprising a pressure source for supplying hydraulic fluid, a control valve disposed in fluid communication with the pressure source, and an actuator assembly fluidly coupled to the control valve; a control system comprising a controller disposed in electrical communication with the control valve; and a wheel force sensor electrically coupled to the controller, the wheel force sensor configured to detect an amount of force being transferred to the wing wheel assembly and communicate the amount of force to the controller; wherein, the actuator assembly is coupled between the main frame section and the frame wing section, the actuator assembly being operably actuated based on an amount of hydraulic pressure received from the control valve; further wherein, the controller operably controls movement of the control valve to actuate the actuator assembly and adjust the amount of force being transferred to the wing wheel assembly.

In a first example of this embodiment, a pressure sensor may be disposed in electrical communication with the controller, where the first pressure sensor detects an amount of hydraulic pressure output by the control valve to the actuator assembly. In a second example, a diagnostic check valve may be disposed in electrical communication with the controller and fluidly coupled to an outlet of the control valve, the diagnostic check valve configured to detect if the pressure sensor is functioning correctly. In a third example, a diagnostic pressure sensor may be disposed in electrical communication with the controller and fluidly coupled to the pressure source, the diagnostic pressure sensor configured to detect a fluid pressure being supplied to the control valve by the pressure source. In a fourth example, the hydraulic control system may include an accumulator fluidly coupled with the actuator assembly. In a fifth example, the controller is configured to receive a force measurement from the wheel force sensor, compare the force measurement to a threshold, and adjust an amount of current sent to the control valve depending upon whether the force measurement is greater or less than the threshold.

In a sixth example of this embodiment, the controller operably communicates more current to the control valve if the force measurement is less than the threshold; and the controller operably communicates less current to the control valve if the force measurement is greater than the threshold. In a seventh example, a second frame wing section may be pivotally coupled to the main frame section, where the second frame wing section includes a second wing wheel assembly for supporting the second frame wing section; and a second actuator assembly may be fluidly coupled to the control valve such that the second actuator assembly is coupled between the main frame section and the second frame wing section; wherein, the second actuator assembly is operably actuated based on an amount of hydraulic pressure received from the control valve. In another example of this embodiment, the controller operably controls movement of the control valve to actuate the second actuator assembly and adjust the amount of force being transferred to the second wing wheel assembly. In yet another example, the control valve may include a second control valve disposed in fluid communication with the pressure source and the second actuator assembly, wherein the controller operably controls movement of the second control valve to actuate the second actuator assembly and adjust the amount of force being transferred to the second wing wheel assembly.

In a further embodiment of the present disclosure, a method is provided for operating an implement having a main frame section and a frame wing section pivotally coupled to the main frame section, a main wheel assembly supporting the main frame section and a wing wheel assembly supporting the frame wing section for movement over a ground surface, a controller, a wheel force sensor, and a hydraulic control system including a pressure source for supplying hydraulic fluid, a control valve disposed in fluid communication with the pressure source, and an actuator assembly fluidly coupled to the control valve. The method includes sending an initial pressure command by the controller to the control valve; actuating the actuator assembly to apply an initial amount of force to the wing wheel assembly; detecting a force measurement on the wing wheel assembly by the wheel force sensor; communicating the force measurement to the controller; comparing the force measurement to a threshold; and sending an adjusted pressure command by the controller to the control valve to adjust the amount of force being applied to the wing wheel assembly based on the comparing step.

In a first example of this embodiment, the method may include reducing the amount of force applied to the wing wheel assembly if the force measurement is greater than the threshold; and increasing the amount of force applied to the wing wheel assembly if the force measurement is less than the threshold. In a second example, the method may include controllably actuating the actuator assembly to adjust the amount of force being applied to the wing wheel assembly. In another example, the method may include controllably moving the control valve to control actuation of the actuator assembly as a function of the comparing step. In a further example, the method may include determining if the frame wing section is in a lowered or raised position; performing the detecting step if the frame wing section is in the lowered position; and maintaining the initial pressure command if the frame wing section is in the raised position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
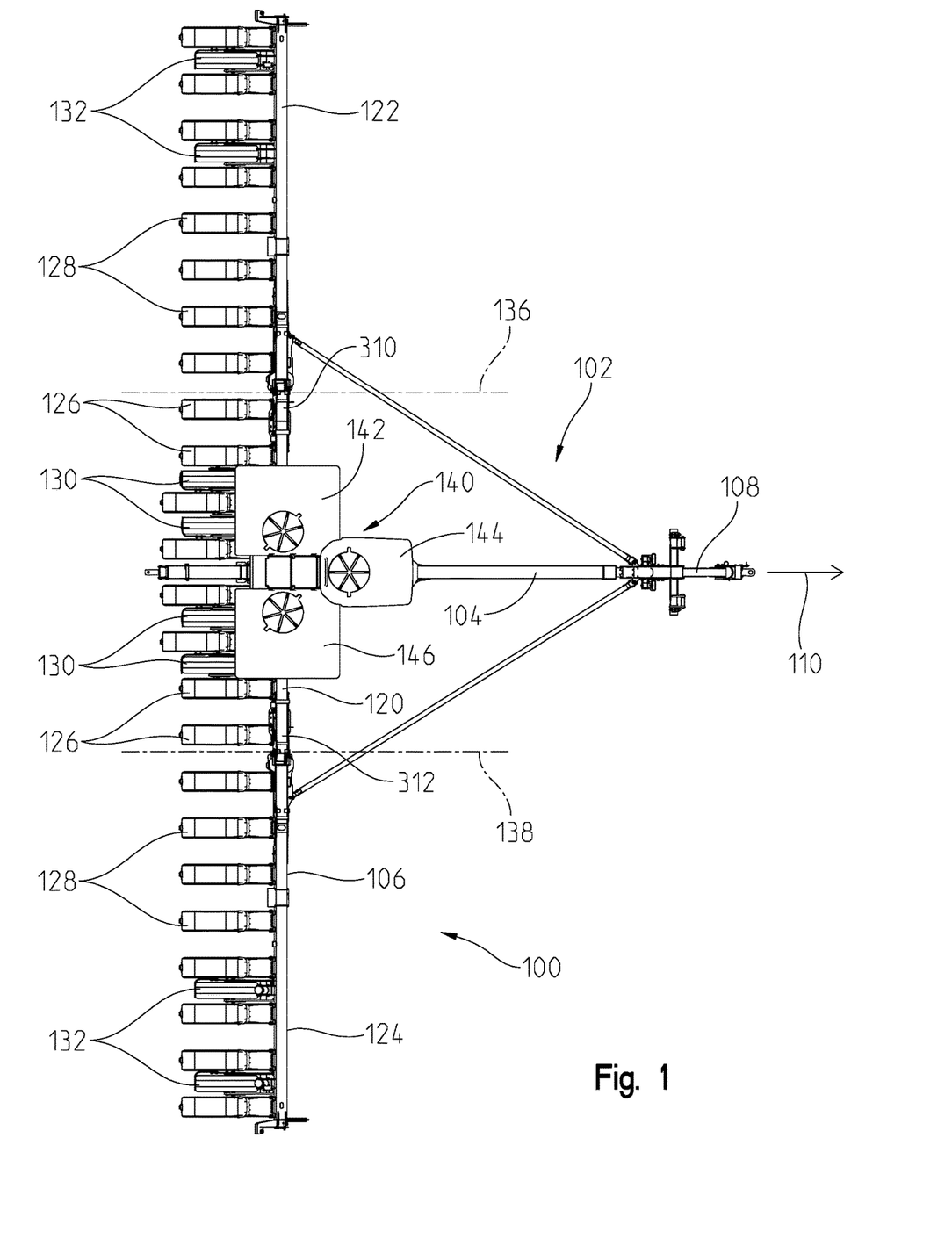
FIG. 1 is a top plan view of an agricultural implement.

In FIG. 1 of the present disclosure, a first embodiment of an implement 100 is shown as a row crop planter. The implement 100 is illustrated including a frame 102 having a draw bar 104 and a tool bar 106 spanning a width thereof. At the forward end of the draw bar 104 is a tongue 108 for coupling the frame 102 to a towing vehicle such as a tractor (not shown). The tool bar 106 is shown having a main frame section 120, a first frame wing section 122, and a second frame wing section 124 extending laterally from the frame main section 120. During operation, the towing vehicle (not shown) may pull or tow the implement 100 in a forward direction 110, as shown in FIG. 1.

The first and second frame wing sections 122, 124 may be pivotally coupled to the frame main section 120 for rotation about fore and aft extending axes 136 and 138. The pivotal connection allows the wing sections to follow the ground contour as the implement 100 moves through a field. A first plurality of row units 126 may be carried by the main frame section 120 and function as main section ground engaging tools. A second plurality of row units 128 may be carried by the first and second frame wing sections 122, 124 and form wing ground engaging tools. In one aspect, the first and second plurality of row units 126 and 128 may be identical. This, however, is not required. In another aspect, the first and second plurality of row units 126, 128 may be different from one another.

The implement 100 may also include a product storage system 140 mounted to the frame main section 120. The product storage system 140 may include product bins or tanks, 142, 144 and 146, as shown in FIG. 1. The bins 142, 144, 146 may hold seed that is delivered pneumatically to mini-hoppers on the row units. In other embodiments (not shown), the bins may hold dry or liquid fertilizer or water that is used to dilute a concentrated insecticide or other chemical to be applied.

Referring still to FIG. 1, the implement 100 is shown including main wheel assemblies 130 coupled to and supporting the frame main section 120 for movement over the ground. Moreover, wing wheel assemblies 132 are coupled to the first and second frame wing sections 122, 124 for supporting the frame wing sections for movement over the ground.

Figure 2:
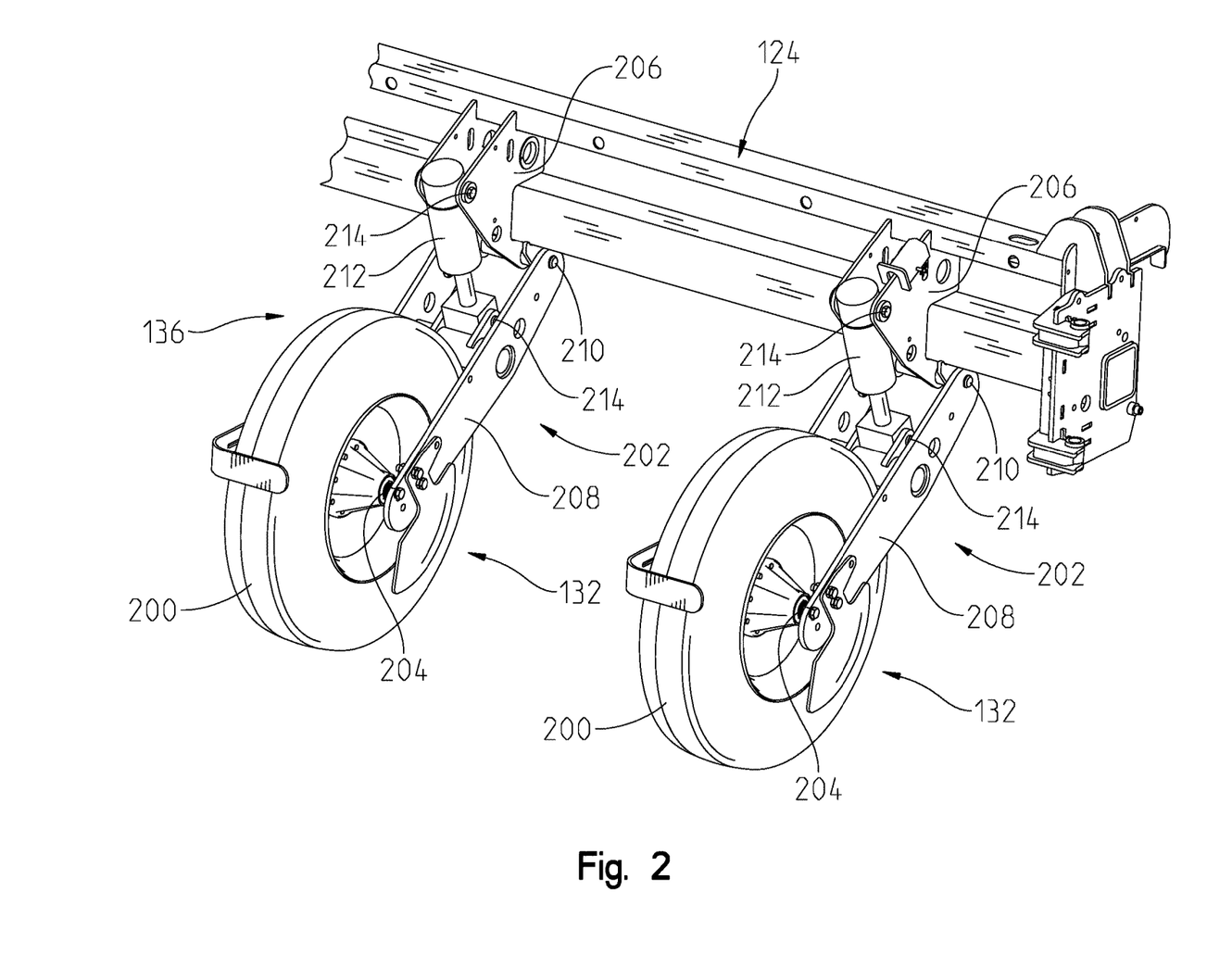
FIG. 2 is a perspective view of a wheel assembly of the implement of FIG. 1.

In FIG. 2, a pair of wing wheel assemblies 132 are shown coupled to the second frame wing assembly 124 (the same may be true of the first frame wing assembly 122). Each wing wheel assembly 132 may include a tire or wheel 200 mounted to a support structure 202 for rotation on an axle 204. The support structure 202 includes a mounting bracket 206 secured to the frame wing section 124 and a lift arm 208. The lift arm 208 may be pivotally connected to the bracket 206 by a pin 210.

The second frame wing section 124 may be raised or lowered by operation of one or more hydraulic cylinders 212 coupled between the lift arms 208 and mounting brackets 206 which are in turn secured to the frame wing section 124. Both the rod end and the base end of each cylinder 212 may be attached to the lift arms 208 and mounting brackets 206 by pins 214.

The main wheel assemblies 130 may have similar components as the wing wheel assemblies 132, namely wheels or tires, lift arms and hydraulic cylinders. The main wheel assemblies 130 may have components sized to carry larger loads than the wing wheel assemblies.

Although not shown in FIGS. 1 and 2, the row unit 128 may include a row unit frame attached to the second frame wing section 124 by a linkage (not shown). The linkage may allow up and down movement of the row unit 128 relative to the tool bar 106 or second frame wing section 124 to follow ground contours. The row unit frame (not shown) may support a double disc furrow opener (not shown) for forming a seed furrow in the soil or ground. Gauge wheels (not shown) may be provided on the sides of the two opener discs. The gauge wheels function as furrow depth regulation members, where each gauge wheel is respectively associated with one disc of double disc furrow opener 124. The gauge wheels may be vertically adjustable relative to the opener discs to vary the depth of the furrow which is cut into the soil by the double disc furrow opener.

A seed meter (not shown), which may also be carried by the row unit frame, receives seed or other product from a seed hopper. Seed or other product may be delivered to the hopper from the product storage system 140 by any conventional pneumatic distribution system, such as the one described in U.S. Pat. No. 6,688,244, the disclosure of which is incorporated herein by reference. The transport of seed or other product to the furrow may be by any conventional system, such as one including a seed tube.

The row unit 128 may also include a pair of closing wheels (not shown) which follow behind the gauge wheels and are positioned generally in line with double disc furrow opener (not shown). The closing wheels may push soil back into the furrow upon the seed or product being deposited therein.

In this disclosure, a control method and system are described for controlling weight or force at the wing wheel assemblies 132, and receiving feedback in a closed loop control manner. There are several reasons for managing or controlling weight of the implement across its width, and particularly at the location of each wing wheel assembly. For example, the present disclosure is designed to control traffic and minimize wing wheel scrubbing. In general, compaction in an agricultural or farming field is undesirable for the soil and plants in the field. The more vehicles, machines, and implements are driven on the field, the more potential damage may occur to the soil regardless of any tillage done after-the-fact. The concept of controlled traffic is to drive along the same path repeatedly to focus or limit the damage to the same area in the field.

As described above, multi-frame or multi-section implements such as the one depicted in FIGS. 1 and 2 often include outer wing sections that have wheels which drive along the ground and may compact the soil. Most conventional weight transfer systems seek to apply or distribute the weight of the implement evenly over the entire width thereof. These conventional systems often apply too much force or weight at the wings to ensure the implement reaches a desired depth across its entire width, and thus overcompact the soil. As a result, the conventional system creates compaction zones at the wings thereby causing unnecessary damage to the soil and plants. Thus, the system and method embodiments of the present disclosure seeks to limit the compaction zones to only the tracks upon which the tractor or tow vehicle is driving on and prevent or reduce compaction zones at the wings.

Another feature associated with weight transfer systems is the desire to keep the wheels or tracks on the main or center frame aligned across the width of the machine or implement with the wheels or tracks on the wing frames. In many conventional systems, all of the wheels have lined up across the width from end-to-end, and this reduce wheel scrubbing and other damage to the soil when the machine or implement turns. However, many machines or implements have alternative designs in which the wheels or tracks are not aligned from end-to-end. In some instances, the wing wheels are moved forward or rearward relative to the main frame. In these instances, there are now two different pivot points when the machine or implement turns. Since the wing wheels often have less weight or downward force on them, the wing wheels often slide across the ground during a turn causing the wheels to scrub and displace seed and/or the soil in an uncontrolled manner. Wheel scrubbing often causes ruts or divots in the soil which impacts planting and harvesting. In this disclosure, system and method embodiments seek to control the weight transfer and limit the weight on the wing wheels to only what is necessary to keep the row units on the ground. In doing so, traffic compaction and wheel scrubbing may be desirably kept to a minimum.

Another feature of the present disclosure is the importance of providing enough force or weight at the wing wheels to ensure the row unit is maintained on the ground. By keeping the row unit on the ground, the cutting disc, disc furrow opener, or working tool remains engaged in the ground. The amount of force required to keep the disc engaged with the ground may differ in various soil conditions. The present disclosure provides system and method embodiments which monitor and control the amount of force applied to the wing wheels to ensure the row unit remains on the ground.

In many conventional weight transfer systems, a control valve is provided which is manually adjustable so an operator can turn a knob or other manual control to adjust the weight settings across the machine or implement. With these systems, however, the weight transfer setting cannot be adjusted when the machine or implement is operating in the field.

In the present disclosure, a proportional and electrically-controlled control valve may be used and disposed in electrical communication with a controller. The controller may receive feedback from a load measurement on the one or more wing wheels and adjust the amount of force on the wing wheel as the machine or implement is running. As will be described, a load cell, strain gauge, or any known force-sensing device may provide real-time feedback to the controller regarding the amount of force being applied to the wing wheel. The controller can then use the feedback and determine how much force is needed to maintain the row unit on the ground but prevent or reduce compaction and wheel scrubbing. Once this determination is made, the controller can adjust a current sent to the control valve to adjust the pressure in a cylinder that applies the force to the wing wheel. This is described in further detail below.

While the present disclosure illustrates and describes several embodiments with respect to a planter, it is to be understood that the present disclosure may apply to an air seeder, tillage, sprayer, or any other machine or implement with a wing frame and wing wheel that is adapted to engage the ground.

Figure 3:
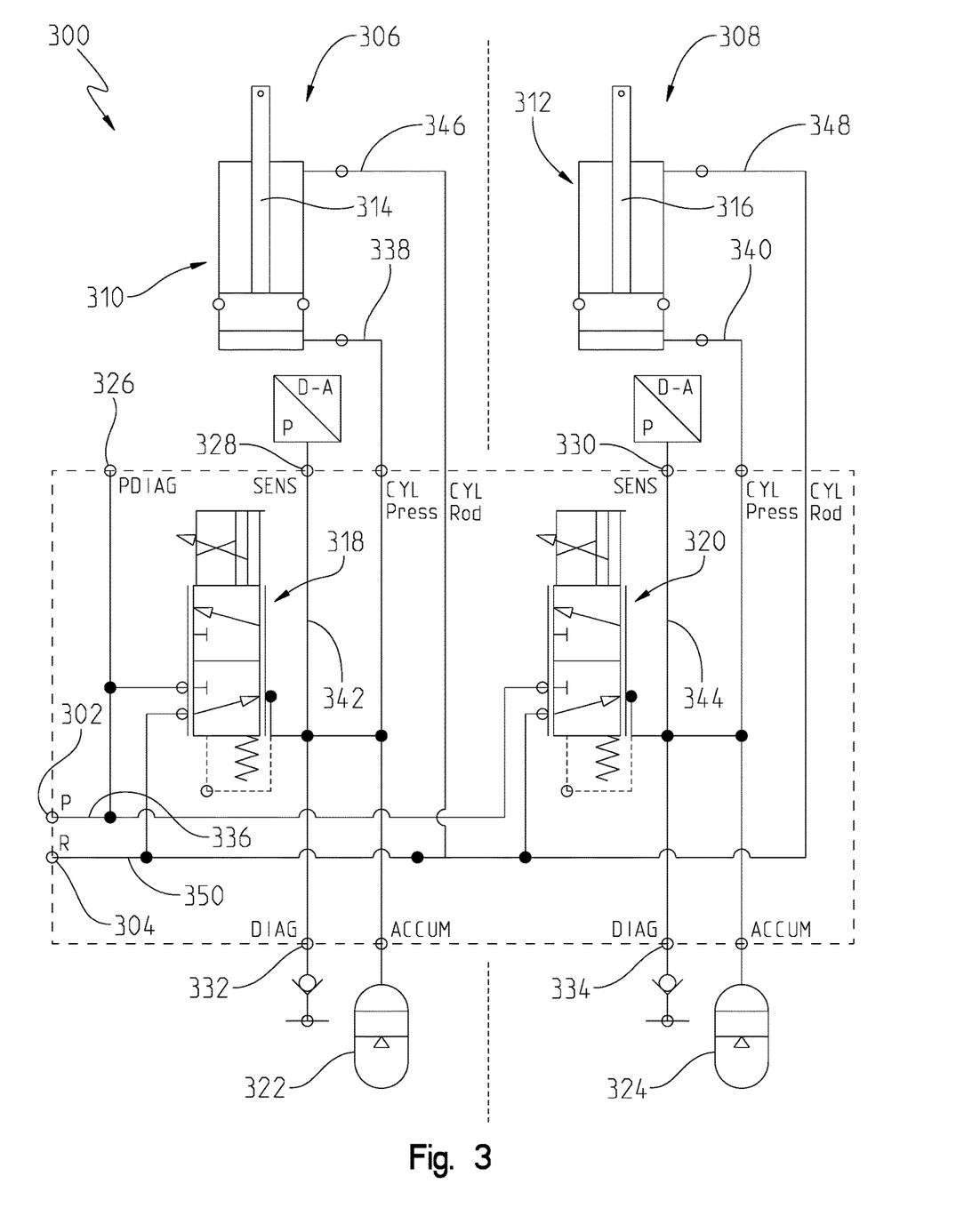
FIG. 3 is a hydraulic schematic for a weight transfer system on the implement of FIG. 1.

Turning to FIG. 3 of the present disclosure, one embodiment of a hydraulic control system 300 for controlling weight transfer of an implement 100 is shown. The hydraulic control system 300 includes a pressure source 302 such as a pump, and a reservoir 304 or tank. The pressure source 302 may be supplied by the tractor or tow vehicle (not shown), and the reservoir may be located on the tractor or tow vehicle as well. Hydraulic fluid may be supplied by the pressure source 302 to the hydraulic control system 300. The system 300 is shown having a first side 306 and a second side 308. The first half 306 includes hydraulic components and lines for hydraulically controlling the force or weight applied to the wing wheel assemblies 132 on the first frame wing section 122, and the second half includes hydraulic components and lines for hydraulically controlling the force or weight applied to the wing wheel assemblies 132 on the second frame wing section 124. The hydraulic control system 300 is shown split into a first side and a second side because the amount of force required for the wing wheel assemblies 132 on the first frame wing section 122 may differ from the amount of force required for the wing wheel assemblies 132 on the second frame wing section 124.

The hydraulic control system 300 may further include a first actuator assembly 310 having a first cylinder 314 and a second actuator assembly 312 including a second cylinder 316. The first actuator assembly 310 and the second actuator assembly 312 are shown in both FIGS. 1 and 3. As shown in FIG. 1, the first actuator assembly 310 is shown coupled between the main frame section 120 and the first frame wing section 122, and the second actuator assembly 312 is shown coupled between the main frame section 120 and the second frame wing section 124. Both actuator assemblies 310, 312 span across the respective fore and aft extending axes 136, 138, respectively. As the cylinders 314, 316 extend and retract, more or less force may be applied to the wing wheel assemblies 132 on the respective frame wing section.

The first actuator assembly 310 may be operably controlled by a first control valve 318. The first control valve 318 may be a proportional, electrically-controlled valve that has a solenoid which receives current from a controller 402 (see FIG. 4). As the solenoid is energized, the first control valve 318 may be actuated to output hydraulic fluid to the first actuator assembly 310 via a first pressure line 338. The amount of hydraulic fluid supplied to the first actuator assembly 310 may be proportional to the amount of current received by the solenoid of the first control valve 318.

Similar to the first actuator assembly 310, the second actuator assembly 312 may be operably controlled by a second control valve 320. The second control valve 320 may also be a proportional, electrically-controlled valve that has a solenoid which receives current from the controller 402. As the solenoid is energized, the second control valve 320 may be actuated to output hydraulic fluid to the second actuator assembly 312 via a second pressure line 340. The amount of hydraulic fluid supplied to the second actuator assembly 312 may be proportional to the amount of current received by the solenoid of the second control valve 320.

The hydraulic control system 300 may also include a first accumulator 322 and a second accumulator 324. Each accumulator may include a gas pre-charge, and the amount of fluid that enters and exits the respective accumulator may be based on a pressure setting. As the first cylinder 314 and second cylinder 316 move, hydraulic fluid may enter or exit the respective accumulator as needed.

The hydraulic control system 300 further includes a plurality of diagnostic ports or sensors in place. For example, a pressure diagnostic port 326 may be in fluid communication with the pressure source 302 via pressure supply line 336. A technician or other user may connect an external sensor or pressure measurement device to the pressure diagnostic port 326 to detect if hydraulic pressure is being supplied to the first and second control valves. The pressure diagnostic port 326 may be in communication with the controller 402 to verify that enough supply pressure is being sent to actuate the control valves. In addition, a first pressure sensor 328 may be in fluid communication with an outlet of the first control valve 318 via pressure line 342. The first pressure sensor 328 is able to communicate to the controller 402 the amount of pressure being supplied to the first actuator assembly 310. Likewise, a second pressure sensor 330 may be in fluid communication with an outlet of the second control valve 320 via pressure line 344. Here, the second pressure sensor 330 is able to communicate to the controller 402 the amount of pressure being supplied to the second actuator assembly 312.

As shown in FIG. 3, a first diagnostic port 332 may be provided in fluid communication with the outlet of the first control valve 318 and the first accumulator 322. A technician or other user may connect an external sensor or pressure measurement device to the first diagnostic port 332 to detect a pressure reading. In an alternative embodiment, the first diagnostic port 332 may include a pressure sensor coupled thereto which may also be in electrical communication with the controller 402 to verify that the first pressure sensor 328 is functioning correctly. Similarly, a second diagnostic port 334 may be provided in fluid communication with the outlet of the second control valve 320 and the second accumulator 324. A technician or other user may connect an external sensor or pressure measurement device to the second diagnostic port 334 to detect a pressure reading. In an alternative embodiment, the second diagnostic port 334 may include a pressure sensor coupled thereto which may further be in electrical communication with the controller 402 to verify that the second pressure sensor 330 is functioning correctly.

The first pressure line 338 may supply the fluid necessary to actuate the first actuator assembly 310 and provide the required force to the wing wheel assemblies 132 on the first frame wing section 122 as part of the weight transfer system. Moreover, the second pressure line 340 supplies the fluid necessary to actuate the second actuator assembly 312 and provide the required force to the wing wheel assemblies 132 on the second frame wing section 124.

Each actuator assembly includes a base end and a rod end. The base end is fluidly coupled to the first or second pressure line, whereas the rod end is fluidly coupled to a first return line 346 or second return line 348. The first return line 346 is fluidly coupled to the rod end of the first actuator assembly 310, and the second return line 348 is fluidly coupled to the rod end of the second actuator assembly 312. As fluid exits the first and second return lines 346, 348, the fluid returns to the reservoir 304 via a main return line 350 shown in FIG. 3.

Although the embodiment of FIG. 3 shows a pair of control valves and accumulators, the present disclosure is not limited to this embodiment. In another embodiment, the hydraulic control system may include a single control valve and accumulator for supplying hydraulic pressure to the first and second actuator assemblies.

Moreover, while the embodiment of FIG. 3 is described as being a hydraulic control system, it is to be understood that the first and second actuator assemblies may be controlled mechanically, electrically, electro-mechanically, pneumatically, or according to any other known method.

Figure 4:
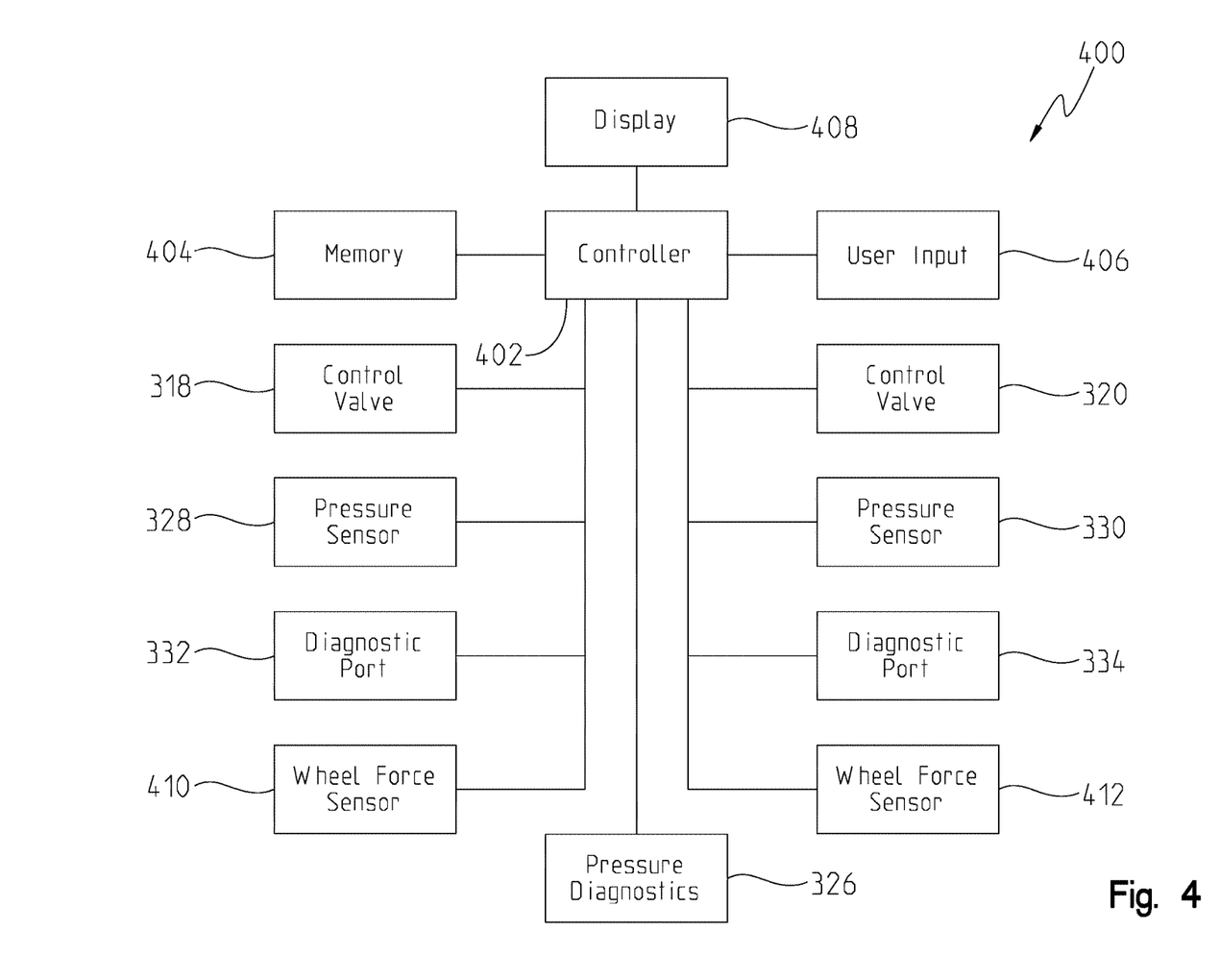
FIG. 4 is a schematic diagram of a control system for the weight transfer system of FIG. 3.

As described above, the first and second control valves 318, 320 may be electrically actuated by a controller 402. In FIG. 4, one embodiment of a control system 400 is shown which includes the controller 402. While only one controller 402 is shown, the controller 402 may include a plurality of controllers for controlling different functions of the machine or implement. For example, one controller may control the weight transfer system via both control valves, while a second controller controls the overall operation of the machine or implement. In any event, the controller 402 in FIG. 4 may include a memory 404 capable of storing different algorithms, processes, programs, a set of instructions, threshold values, charts, predefined settings, etc. As such, the controller 402 may include a processor capable of executing the algorithms, processes, programs, etc.

The control system 400 may also include a display 408 located in a cab of the tractor or tow vehicle, for example. The display 408 may show the diagnostic readings of the different sensors including the first and second pressure sensors 328, 330 and loads measured on the different wing wheel assemblies via a first wheel sensor 410 and a second wheel sensor 412. Each wheel sensor may include a strain gauge, a load cell, or any other known device for measuring force or weight on a wing wheel assembly 132. In this embodiment, the first wheel sensor 410 may detect the force on a wing wheel assembly 132 on the first frame wing section 122, and the second wheel sensor 412 may detect the force on a wing wheel assembly 132 on the second frame wing section 124.

In an alternative embodiment, the display 408 may be in electrical communication with the controller 402 such that it also displays readings from individual sensors coupled to the pressure diagnostic port 326, the first diagnostic port 332, and the second diagnostic port 334. As described above, the controller 402 is further electrically coupled to the first and second control valves 318, 320 to control actuation of both valves.

A user input 406 is also shown in FIG. 4. The user input 406 may be any type of control in the cab or on the machine or implement which allows the operator to communicate a desired command to the controller 402. For example, the operator may wish to manually override the controller 402 in the event of a malfunction with the controller or one of the sensors. The user input 406, for example, may allow the operator to set the desired force on the first and second frame wing sections independently of the controller 402.

Figure 5:
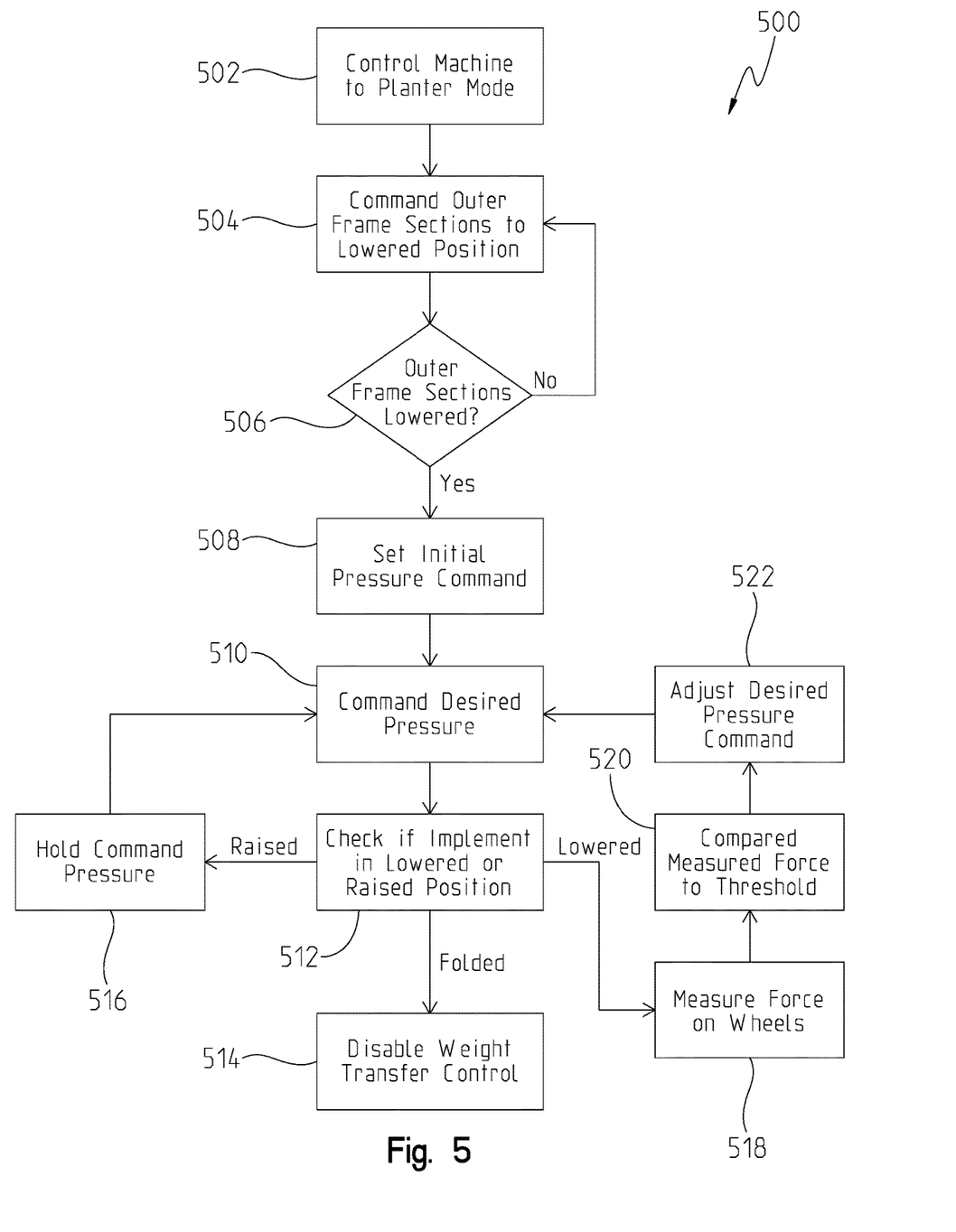
FIG. 5 is a method of controlling the weight transfer system of FIG. 3.

Turning to FIG. 5, an embodiment of a method for controlling force or weight transfer to an implement, such as the one shown in FIGS. 1 and 2, will now be described. The method 500 may be in the form of an algorithm or control logic stored in the memory 404. The algorithm or control logic may include a plurality of blocks or steps which are executable by the control system 400 of FIG. 4 and the hydraulic control system 300 of FIG. 3. Moreover, the method 500 is described in regards to a planter such as the one depicted in FIGS. 1 and 2, but the method 500 is applicable to any type of machine or implement in the agricultural industry.

In FIG. 5, the method 500 may include a first block 502 which is executable by the controller 402 to control the machine or implement to its planter mode. For sake of this block, it is presumed that the machine or implement may include at least two modes, i.e., a transport or non-planter mode and an operating or planter mode. In one embodiment, the machine or implement may include more than two modes, whereas in a different embodiment the machine or implement may include only a single mode.

In the event the machine or implement is in a transport mode, for example, the controller 402 may also send a command in block 504 to lower the first and second frame wing sections 122, 124 to their lowered positions. One or more position sensors (not shown), switches, or the like may detect the position of the first and second frame wing sections 122, 124 and communicate the position to the controller 402. As this occurs, the controller 402 makes a determination in block 506 as to whether the first and second frame wing sections 122, 124 have reached their lowered positions. If not, the controller 402 repeats the command in block 504. If the first and second frame wing sections 122, 124 have reached their lowered positions in block 506, the method 500 may advance to block 508.

In block 508, the controller 402 may execute the method 500 by setting an initial pressure command. The initial pressure command may be a predetermined pressure for applying a nominal amount of weight to the wing wheel assemblies 132. This pressure, for example, may be set by an operator and stored in the memory 404. In any event, the controller 402 may command the initial pressure to actuate the first and second control valves 318, 320. The first and second pressure sensors 328, 330 may detect the initial hydraulic pressure output by the respective control valves and communicate the pressures to the controller 402. In this way, the controller 402 is able to verify in block 510 that the initial pressure command has been received and the control valves are outputting the proper amount of hydraulic pressure.

Once the initial pressure command in block 508 is sent and the controller 402 is able to verify as much in block 510, the method 500 advances to block 512 where the controller 402 once again checks the position of the machine or implement. In the event the implement is in its folded configuration, the method 500 advances to block 514 where the controller 402 disables the weight transfer algorithm and method 500 terminates. At this point, the controller 402 detects that the operator has either elected not to plant or something has malfunctioned.

In some instances, the operator may raise the row units 128 or wing sections off the ground to either transport the implement or delay planting. In this case, the method 500 may advance to block 516 where the controller 402 is configured to hold the initial pressure command and not make any changes to the pressure command.

If, however, the controller 402 determines that the machine or implement is still in its lowered position, then the method 500 may advance to block 518 where the force on each wing wheel assembly 132 is measured and communicated to the controller 402. As the controller 402 receives force measurements (or weight measurements) applied to each wing wheel assembly 132, the controller 402 compares the measured force to a force threshold in block 520. There is a preset margin or range of force that is desirable for each wing wheel assembly 132 as the implement travels in the field. This margin or range may be defined as a threshold for purposes of this disclosure and FIG. 5. In block 520, the controller 402 therefore is comparing the measured force at each wing wheel assembly to the threshold.

If the measured force exceeds the threshold in block 520, then the method 500 may advance to block 522 where the controller 402 is able to make a determination that too much force or weight is being transferred to that respective wing wheel assembly 132. As such, the controller 402 may command less current to the respective control valve to output less hydraulic pressure to the respective actuator assembly. If, however, it is determined that the measured force is less than the threshold in block 520, then the method 500 again may advance to block 522 where the controller 402 is able to determine that too little force or weight is being transferred to the respective wing wheel assembly 132. As such, the controller 402 may command more current to the respective control valve to output more hydraulic pressure to the respective actuator assembly.

As a result, the force feedback received by the controller 402 for each wing wheel assembly is compared to the threshold. In some instances, each wing wheel assembly may have its own threshold margin or range of force or weight which is desired to avoid soil compaction or wheel scrubbing. This may be especially true based on the location of the wing wheel assembly relative to the main frame section. In other instances, each wing wheel assembly may have the same threshold margin or range of force or weight which is desired. In any event, the threshold may be stored in the memory 404 of the controller 402 and used in block 520 to determine if too much or too little weight is being transferred to the respective wing wheel assemblies 132.

In the embodiment of FIG. 5, the method 500 forms a closed-loop weight transfer control between blocks 510, 512, 518, 520, and 522. As long as the implement or machine remains in its lowered position, the method 500 may continuously run through these blocks or steps to adjust the amount of force on each wing wheel assembly 132 on both the first and second frame wing sections 122, 124. In one non-limiting example, the closed loop control method may be executed every 20-50 milliseconds to adjust the amount of hydraulic pressure sent to the first and second actuator assemblies 310, 312.

It is further noted that the soil conditions may change the target amount of force necessary for each wing wheel assembly 132. During operation, each row unit 128 exerts an upward force on the respective frame wing section. These upward forces may counterbalance the weight of each row unit, the weight of the frame, and the amount of force or weight being transferred to each wing wheel assembly. The controller 402 may be programmed to adjust the force exerted at each wing wheel assembly to keep each row unit on the ground, the working tools or discs engaged with the ground, and prevent or reduce soil compaction and wheel scrubbing.

As described herein, the method and system embodiments in the present disclosure seek to adjust the amount of force or weight transferred to a respective wing wheel assembly not to equalize the weight across the machine or implement, but rather to reduce soil compaction and wheel scrubbing. Moreover, the manner in which this is accomplished may be via closed loop control.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural implement for traversing a field to perform a work function, comprising:
    a main frame section including a main wheel assembly for supporting the main frame section;
    a first frame wing section pivotally coupled to a first side of the main frame section, the first frame wing section including a first wing wheel assembly for supporting the first frame wing section;
    a second frame wing section pivotally coupled to a second side of the main frame section, the second frame wing section including a second wing wheel assembly for supporting the second frame wing section;
    a hydraulic control system comprising a pressure source for supplying hydraulic fluid, a first control valve and a second control valve disposed in fluid communication with the pressure source, a first actuator assembly fluidly coupled to an outlet of the first control valve, and a second actuator assembly fluidly coupled to an outlet of the second control valve;
    a control system comprising a controller disposed in electrical communication with the first and second control valves;
    a first pressure sensor and a second pressure sensor disposed in electrical communication with the controller, where the first pressure sensor is fluidly coupled to the first control valve for detecting an amount of hydraulic pressure output by the first control valve to the first actuator assembly, and the second pressure sensor is fluidly coupled to the second control valve for detecting an amount of hydraulic pressure output by the second control valve to the second actuator assembly; and
    a first wheel force sensor and a second wheel force sensor electrically coupled to the controller, the first wheel force sensor configured to detect an amount of force on the first wing wheel assembly, and the second wheel force sensor configured to detect an amount of force on the second wing wheel assembly;
    wherein, the first actuator assembly is operably actuated based on an amount of hydraulic pressure received from the first control valve, and the second actuator assembly is operably actuated based on an amount of hydraulic pressure received from the second control valve;
    further wherein, the first actuator assembly is coupled between the main frame section and the first frame wing section and the second actuator assembly is coupled between the main frame section and the second frame wing section.

2. The agricultural implement of claim 1, wherein:
    the controller operably controls movement of the first control valve to actuate the first actuator assembly and adjust the amount of force on the first wing wheel assembly; and
    the controller operably controls movement of the second control valve to actuate the second actuator assembly and adjust the amount of force on the second wing wheel assembly.

3. The agricultural implement of claim 1, wherein the hydraulic control system comprises a first accumulator fluidly coupled with the first actuator assembly and a second accumulator fluidly coupled with the second actuator assembly.

4. The agricultural implement of claim 1, wherein the controller is configured to receive a force measurement from the first wheel force sensor, compare the force measurement to a threshold, and adjust an amount of current sent to the first control valve depending upon whether the force measurement is greater or less than the threshold.

5. An implement for traversing a field, comprising:
a main frame section including a main wheel assembly for supporting the main frame section;
a frame wing section pivotally coupled to the main frame section, the frame wing section including a wing wheel assembly for supporting the frame wing section;
a hydraulic control system comprising a pressure source for supplying hydraulic fluid, a control valve disposed in fluid communication with the pressure source, and an actuator assembly fluidly coupled to the control valve;
a control system comprising a controller disposed in electrical communication with the control valve;
a pressure sensor disposed in electrical communication with the controller, where the pressure sensor detects an amount of hydraulic pressure output by the control valve to the actuator assembly; and
a wheel force sensor electrically coupled to the controller, the wheel force sensor configured to detect an amount of force on the wing wheel assembly and communicate the amount of force to the controller;
wherein, the actuator assembly is coupled between the main frame section and the frame wing section, the actuator assembly being operably actuated based on an amount of hydraulic pressure received from the control valve;
further wherein, the controller operably controls movement of the control valve to actuate the actuator assembly and adjust the amount of force on the wing wheel assembly so that the amount of force satisfies a predefined threshold.

6. The implement of claim 5, further comprising a diagnostic pressure sensor disposed in electrical communication with the controller and fluidly coupled to the pressure source, the diagnostic pressure sensor configured to detect a fluid pressure being supplied to the control valve by the pressure source.

7. The implement of claim 5, wherein the hydraulic control system comprises an accumulator fluidly coupled with the actuator assembly.

8. The implement of claim 5, wherein the controller is configured to receive a force measurement from the wheel force sensor, compare the force measurement to a threshold, and adjust an amount of current sent to the control valve depending upon whether the force measurement is greater or less than the threshold.

9. The implement of claim 8, wherein:
the controller operably communicates more current to the control valve if the force measurement is less than the threshold; and
the controller operably communicates less current to the control valve if the force measurement is greater than the threshold.

10. The implement of claim 5, further comprising:
a second frame wing section pivotally coupled to the main frame section, the second frame wing section including a second wing wheel assembly for supporting the second frame wing section; and
a second actuator assembly fluidly coupled to the control valve, the second actuator assembly being coupled between the main frame section and the second frame wing section;
wherein, the second actuator assembly is operably actuated based on an amount of hydraulic pressure received from the control valve.

11. The implement of claim 10, wherein the controller operably controls movement of the control valve to actuate the second actuator assembly and adjust the amount of force on the second wing wheel assembly.

12. The implement of claim 11, wherein the control valve comprises a second control valve disposed in fluid communication with the pressure source and the second actuator assembly, wherein the controller operably controls movement of the second control valve to actuate the second actuator assembly and adjust the amount of force on the second wing wheel assembly.

13. The implement of claim 10, wherein the controller operably controls movement of the control valve to actuate the first actuator assembly and the second actuator assembly so that the same amount of force is received on the first and second wing wheel assemblies.

14. A method of operating an implement having a main frame section and a frame wing section pivotally coupled to the main frame section, a main wheel assembly supporting the main frame section and a wing wheel assembly supporting the frame wing section for movement over a ground surface, a controller, a wheel force sensor, and a hydraulic control system including a pressure source for supplying hydraulic fluid, a control valve disposed in fluid communication with the pressure source, and an actuator assembly fluidly coupled to the control valve, the method comprising:
sending an initial pressure command by the controller to the control valve;
actuating the actuator assembly to apply an initial amount of force to the wing wheel assembly;
detecting a force measurement on the wing wheel assembly by the wheel force sensor;
communicating the force measurement to the controller;
comparing the force measurement to a predefined threshold; and
sending an adjusted pressure command by the controller to the control valve to adjust the amount of force being applied to the wing wheel assembly based on the comparing step.

15. The method of claim 14, further comprising:
reducing the amount of force applied to the wing wheel assembly if the force measurement is greater than the threshold; and
increasing the amount of force applied to the wing wheel assembly if the force measurement is less than the threshold.

16. The method of claim 14, further comprising controllably actuating the actuator assembly to adjust the amount of force being applied to the wing wheel assembly.

17. The method of claim 14, further comprising controllably moving the control valve to control actuation of the actuator assembly as a function of the comparing step.

18. The method of claim 14, further comprising:
determining if the frame wing section is in a lowered or raised position;
performing the detecting step if the frame wing section is in the lowered position; and maintaining the initial pressure command if the frame wing section is in the raised position.

* * * * *